United States Patent [19]

Suenaga et al.

[11] Patent Number: 5,131,995

[45] Date of Patent: Jul. 21, 1992

[54] METHOD OF MANUFACTURING TITANIUM MAGNETIC DISK SUBSTRATE

[75] Inventors: Hiroyoshi Suenaga; Hideaki Fukai; Toshio Sakiyama; Kuninori Minakawa, all of Tokyo, Japan

[73] Assignee: NKK Corporation, Tokyo, Japan

[21] Appl. No.: 662,272

[22] Filed: Feb. 28, 1991

[30] Foreign Application Priority Data

Mar. 9, 1990 [JP] Japan .................................. 2-56450

[51] Int. Cl.$^5$ ............................................. C23C 14/34
[52] U.S. Cl. .............................. 204/192.16; 204/192.2
[58] Field of Search ............ 204/192.16, 192.2, 192.15

[56] References Cited

U.S. PATENT DOCUMENTS 4,552,820 11/1985 Lin et al. ............................. 428/611
4,990,362 2/1991 Kibe et al. ............................. 427/38

FOREIGN PATENT DOCUMENTS 52-105804 9/1977 Japan .
57-50324 3/1982 Japan .
1-112521 5/1989 Japan .

*Primary Examiner*—Aaron Weisstuch
*Attorney, Agent, or Firm*—Frishauf, Holtz, Goodman & Woodward

[57] ABSTRACT

After the surface roughness of a titanium substrate is set to be $R_{max} \leq 0.08$ μm, a hardened layer having a hardness of $H_v \geq 250$ is formed thereon to have a thickness of 50 to 250 μm by sputtering, thereby manufacturing a titanium magnetic disk substrate.

12 Claims, No Drawings

METHOD OF MANUFACTURING TITANIUM MAGNETIC DISK SUBSTRATE

BACKGROUND OF THE INVENTION

1. Field of the Invention

The present invention relates to a method of manufacturing a titanium magnetic disk substrate applied to a magnetic disk for high-density recording/reproduction.

2. Description of the Related Art

In recent years, as capacity and recording density of magnetic disks have been increased, it has been attempted to decrease the thickness of the magnetic film formed on a magnetic disk substrate and the space between a magnetic head and the magnetic film.

Recording/reproduction of information on such a magnetic disk is generally performed by a CSS (Contact Start Stop) system. In this system, a magnetic head and a magnetic film surface on disk are brought into contact with each other when an operation is started, and the magnetic disk is rotated at a predetermined rate to float the magnetic head from the magnetic film surface, thereby performing recording/reproduction. In this CSS system, however, the magnetic film surface is readily placed in a contact friction state when an operation is started or ended. Therefore, improvement in CSS characteristics in a high-density recording magnetic disk is expected to be increasingly important in the future.

Under the circumstances, a magnetic disk substrate currently must satisfy both of the following two conditions.

(1) A magnetic disk substrate must have a small surface roughness ($R_{max} < 0.1$ μm).

(2) A magnetic disk substrate must have a high hardness and good CSS characteristics.

Although a aluminum alloy has been conventionally uses as a magnetic disk substrate material, it has been recently attempted to use titanium in place of the aluminum alloy as a magnetic disk substrate. This is because titanium is superior to the aluminum alloy in terms of heat resistance to enable formation of a magnetic film over a wide area by sputtering and can improve the characteristics of the magnetic film. However, the hardness of titanium is low (the hardness $H_v$ of a titanium magnetic disk substrate is at most 160) i.e., much lower than that of a conventional NiP-plated aluminum alloy ($H_v$ = about 500), resulting in poor CSS characteristics. Improvement of the CSS characteristics by increasing the hardness, therefore, is one key to applying titanium to a magnetic disk substrate.

For this reason, various methods have been attempted in order to increase the hardness of titanium. For example, Published Unexamined Japanese Patent application No. 1-112521 proposes a method of improving the CSS characteristics by using a titanium alloy having a section hardness $H_v$ of 250 or more, and Published Unexamined Japanese Patent Application No. 52-105804 proposes a method of oxidizing or nitriding a surface layer (0.03 to 10 μm) after a mirror surface polishing is performed, thereby increasing the hardness of the surface layer.

The method disclosed in Published Unexamined Japanese Patent application No. 1-112521, however, is disadvantageous especially in terms of manufacturing cost. That is, of the titanium alloys disclosed as usable in this method, both the λ-type and a +β-type titanium alloys have low cold workabilities. In order to obtain a cold-rolled thin plate as a stock material for a magnetic disk substrate, therefore, since a plurality of cold rolling-intermediate annealing steps must be performed, manufacturing cost is significantly increased as compared with that of pure titanium. Although a β-type titanium alloy of the alloys disclosed in the method has good cold workability, a large amount of alloy elements must be added. As a result, cost of the raw material to be melted is significantly increased as compared with that of pure titanium.

In the method disclosed in Published Unexamined Japanese Patent application No. 52-105804, the thickness of any obtained hardened layer is at most 10 μm, and this thickness is insufficient to obtain satisfactory characteristics by the CSS system.

In addition Published Unexamined Japanese Patent application No. 57-50324 proposes a method of increasing the surface hardness of an aluminum alloy magnetic disk substrate, thereby improving the surface roughness obtained after polishing. In this method, a titanium nitride or oxide layer is formed on a polished aluminum alloy magnetic disk substrate by reactive sputtering or the like, and mechanopolishing is performed to obtain a mirror surface. When this method is used or the method is applied to a titanium magnetic disk, however, peeling of the magnetic film causes degradation of the CSS characteristics for the following reason. That is, atoms on the surface of the magnetic film fall off to inevitably form defects during the titanium nitride or oxide sputtering step, and contaminants are sealed in these defects during a polishing stop which is performed after the sputtering, thereby decreasing the adhesion strength of the magnetic film.

SUMMARY OF THE INVENTION

The present invention has been made in consideration of the above situation and has as its object to provide a method of manufacturing a titanium magnetic disk substrate, which can provide at low cost a titanium magnetic disk substrate having good surface conditions, CSS characteristics, and adhesion strength of a magnetic film.

According to the present invention, there is provided a method of manufacturing a titanium magnetic disk substrate, comprising the steps of preparing a titanium substrate, setting the surface roughness of the titanium substrate to be $R_{max} \leq 0.08$ μm, and forming a hardened layer having a hardness of $H_v \geq 250$ on the titanium substrate to a thickness of 50 to 250 μm by sputtering.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

In the present invention, after a surface roughness $R_{max}$ of a titanium substrate is set to be $R_{max} \leq 0.08$ μm, a hardened layer having a hardness of $H_v \geq 250$ is formed thereon to a thickness of 50 to 250 μm by sputtering.

In this case, the titanium substrate may consist of either pure titanium or a titanium alloy.

Although the method of obtaining the surface roughness of $R_{max} \leq 0.08$ μm is not particularly limited, this surface roughness is generally obtained by polishing the substrate surface. The polishing method need only control the surface roughness $R_{max}$ and may be any polishing method such as wet polishing or electropolishing as long as the desired surface roughness is obtained.

The surface roughness of the titanium substrate is set to be $R_{max} \leq 0.08$ μm for the following reason. In the present invention, after the hardened layer is formed by sputtering, a magnetic film is immediately formed without performing polishing. Therefore, in order to obtain a good surface condition of $R_{max} \leq 0.01$ μm on the surface of the titanium magnetic disk substrate after the hardened layer is sputtered thereon, the surface roughness of the titanium substrate before the sputtering must satisfy at least $R_{max} = 0.08$ μm.

Formation of the hardened layer is preferably performed by sputtering for the following reason. Since a hardened film formed by another method such as ion plating or vapor deposition often poses problems in uniformity or density, good CSS characteristics cannot be easily obtained, or peeling of the magnetic film occurs.

The hardness of the hardened layer formed by sputtering is set to be $H_v \geq 250$ because, if the hardness is set to be $H_v < 250$, the CSS characteristics are degraded even when the thickness of the hardened layer is satisfactory. Note that the hardness of the hardened layer does not particularly have its upper limit in relation to the CSS characteristics.

The thickness of the hardened layer is set to be 50 to 250 μm for the following reason. That is, if the thickness is less than 50 μm, the CSS characteristics cannot be improved even when a hardened layer having a high hardness is formed. If, on the other hand, the thickness exceeds 250 μm, the surface roughness is significantly degraded by sputtering.

A material and a composition for forming the hardened layer need only be nonmagnetic because a magnetic film is formed thereon. That is, as long as $H_v \geq 250$ is satisfied, the material and the composition are not particularly limited but can be selected from a wide variety of materials and compositions such as a pure metal, an alloy, an intermetallic compound, a carbide, an oxide, and a nitride.

In this method, since the surface roughness of the titanium substrate satisfies $R_{max} \leq 0.08$ μm beforehand, good surface conditions can be obtained after the hardened layer is formed by sputtering. In addition, since the hardness satisfies $H_v \geq 250$, good CSS characteristics can be obtained. Furthermore, since the hardened layer is formed after the surface roughness is decreased, no polishing step need be performed after the hardened layer is formed. Therefore, since the magnetic film can be formed immediately after formation of the hardened layer without performing a polishing step, peeling of the magnetic film can be prevented. Moreover, since no special alloy element nor rolling processing need be used, a magnetic disk substrate can be manufactured at a low cost.

EXAMPLES

Various types of hardened layers were formed on 1.2-mm thick 3.5″ pure titanium substrates having surface roughnesses $R_{max}$ of 0.05 to 0.15 μm by sputtering, thereby forming titanium magnetic disk substrate samples. This sputtering was performed by setting a vacuum degree of $1 \times 10^{-2}$ Torr in a chamber. The hardened layers were formed by using Ti ($H_v = 160$), TiO$_x$ ($H_v = 170$ to 1,500), TiAl ($H_v = 200$), Ti$_3$Al ($H_v = 250$), Al$_3$Ti ($H_v = 260$), TiN ($H_v = 2,500$), TiC ($H_v = 3,200$), ZrC ($H_v = 2,600$), and WC ($H_v = 2,400$) to thicknesses of 15 to 500 μm. The formation conditions are summarized in Tables 1 and 2. Sample Nos. 1 to 26 shown in Table 1 are examples falling within the range of the present invention, and sample Nos. 27 to 51 shown in Table 2 are comparative examples falling out-side the range of the present invention.

In each sample, a Co magnetic film was formed immediately after sputtering. The formation conditions were a chamber vacuum degree of $1 \times 10^{-3}$ Torr, a substrate temperature of 150° C., and a magnetic film thickness of 1,000 Å.

The CSS characteristics and the surface roughness of each disk substrate sample were measured. These measurements were performed after a 500-Å thick carbon protective film and a Freon liquid lubricating layer were formed on the magnetic layer. The CSS characteristic value was evaluated by the number of CSS operations performed before a head is damaged by peeling of the magnetic film or before of the magnetic disk substrate is formed by the head striking against the substrate. The surface roughness was evaluated by measuring three portions o the surface of the substrate sample at random. The measurement results are also shown in Tables 1 and 2.

TABLE 1

| Sample No. | Substrate Surface Roughness (μm) | Hardened Layer Composition | Hardened Layer Thickness (μm) | Hardened Layer Thickness $H_v$ | CSS Characteristics | Surface Roughness (μm) |
|---|---|---|---|---|---|---|
| Examples | | | | | | |
| 1 | 0.05 | TiO$_x$ | 200 | 250 | 16000 | 0.07 |
| 2 | " | " | " | 300 | 16200 | " |
| 3 | " | " | " | 500 | 15800 | " |
| 4 | " | " | " | 1500 | 16000 | " |
| 5 | " | " | 50 | " | 15900 | " |
| 6 | " | " | 100 | " | 16200 | " |
| 7 | " | " | 150 | " | 15800 | " |
| 8 | 0.05 | TiO$_x$ | 250 | 1500 | 16300 | 0.06 |
| 9 | 0.07 | " | 200 | " | 16300 | 0.08 |
| 10 | 0.08 | " | " | " | 16200 | 0.09 |
| 11 | " | " | 50 | " | 16100 | 0.08 |
| 12 | " | " | 250 | " | 16800 | 0.09 |
| 13 | 0.05 | Ti$_3$Al | 50 | 250 | 16300 | 0.07 |
| 14 | " | " | 250 | " | 16000 | " |
| 15 | 0.05 | Al$_3$Ti | 50 | 260 | 16300 | 0.07 |
| 16 | " | " | 250 | " | 16500 | " |

TABLE 1-continued

| Sample No. | Substrate Surface Roughness (μm) | Hardened Layer Composition | Hardened Layer Thickness (μm) | Hardened Layer Thickness $H_v$ | CSS Characteristics | Surface Roughness (μm) |
| --- | --- | --- | --- | --- | --- | --- |
| 17 | " | TiN | 50 | 2500 | 15900 | 0.08 |
| 18 | " | " | 200 | " | 16200 | 0.06 |
| 19 | 0.07 | " | " | " | 16300 | 0.08 |
| 20 | 0.08 | " | " | " | 16000 | 0.09 |
| 21 | 0.05 | TiC | 50 | 3200 | 15900 | 0.08 |
| 22 | 0.05 | TiC | 200 | 3200 | 15900 | 0.08 |
| 23 | " | ZrC | 50 | 2600 | 16300 | " |
| 24 | " | " | 200 | " | " | " |
| 25 | " | WC | 50 | 2400 | 16200 | 0.09 |
| 26 | " | " | 200 | " | " | 0.08 |

TABLE 2

| Sample No. | Substrate Surface Roughness (μm) | Hardened Layer Composition | Hardened Layer Thickness (μm) | Hardened Layer Thickness $H_v$ | CSS Characteristics | Surface Roughness (μm) |
| --- | --- | --- | --- | --- | --- | --- |
| Comparative Examples | | | | | | |
| 27 | 0.05 | — | — | — | 3000 | 0.06 |
| 28 | " | Ti | 250 | 160 | 3100 | 0.07 |
| 29 | " | $TiO_x$ | 200 | 170 | 2900 | " |
| 30 | " | " | " | 200 | 3000 | " |
| 31 | " | " | " | 240 | 3200 | " |
| 32 | " | " | 15 | 1500 | 3300 | 0.06 |
| 33 | " | " | 30 | " | 3200 | 0.07 |
| 34 | 0.05 | $TiO_x$ | 40 | 1500 | 3200 | 0.07 |
| 35 | " | " | 260 | " | 16500 | 0.12 |
| 36 | " | " | 300 | " | 16000 | 0.14 |
| 37 | " | " | 400 | " | 16800 | 0.13 |
| 38 | " | " | 500 | " | 16200 | 0.14 |
| 39 | 0.09 | " | 200 | " | 16600 | 0.12 |
| 30 | 0.10 | " | " | " | 16300 | 0.13 |
| 41 | 0.12 | $TiO_x$ | 200 | 1500 | 16700 | 0.13 |
| 42 | 0.15 | " | " | " | 16600 | 0.14 |
| 43 | 0.09 | " | 50 | " | 15900 | 0.13 |
| 44 | " | " | 250 | " | 16200 | 0.14 |
| 45 | 0.05 | TiAl | " | 200 | 3100 | 0.07 |
| 46 | " | TiN | 40 | 2500 | 3300 | 0.06 |
| 47 | 0.09 | " | 200 | " | 16200 | 0.12 |
| 48 | 0.12 | TiN | 200 | 2500 | 16000 | 0.15 |
| 49 | 0.05 | TiC | 40 | 3200 | 3500 | 0.07 |
| 50 | " | ZrC | " | 2600 | 3900 | 0.08 |
| 51 | " | WC | " | 2400 | 3500 | 0.07 |

As is apparent from Table 1, good CSS characteristics could be obtained only when the hardness of the hardened layer satisfied $H_v \geq 250$ and its thickness was 50 μm. A surface roughness of less than 0.1 μm could be obtained after sputtering only when the surface roughness of the substrate satisfied $R_{max} \geq 0.08$ μm and the thickness of the hardened layer was 250 μm or less. That is, it was confirmed that any of the examples falling within the range of the present invention has good CSS characteristics and a small surface roughness, i.e., was excellent in surface conditions.

As is apparent from Table 2, on the other hand, no satisfactory results could be obtained by the comparative examples falling outside the range of the present invention. That is, either the CSS characteristic value or the surface roughness was poor in any of sample No. 25 in which no hardened layer was formed, sample Nos. 39 to 44, 47, and 48 in which the surface roughness of the substrate satisfied $R_{max} > 0.8$, sample Nos. 32 to 38, 46, and 49 to 51 in which the thickness of the hardened layer fell outside the range of 50 to 250 μm, and sample Nos. 28 to 31 and 45 in which the hardness of the hardened layer satisfied $H_v < 250$.

From the above results, it was confirmed that the method of the present invention in which the surface roughness of the titanium substrate was set to be $R_{max} \leq 0.08$ and the hardened layer having a hardness $H_v \leq 250$ was formed to a thickness of 50 to 250 μm by sputtering was effective.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a titanium magnetic disk substrate, comprising the steps of:
   preparing a titanium substrate;
   setting the surface roughness of said titanium substrate to be $R_{max} \leq 0.08$ μm; and
   forming a hardened layer having a hardness of $H_v \geq 250$ on said titanium substrate to a thickness of 50 to 250 μm by sputtering.

2. A method according to claim 1, wherein said titanium substrate is formed of pure titanium.

3. A method according to claim 1, wherein said step of setting the surface roughness of said titanium substrate is achieved by polishing the surface of said titanium substrate.

4. A method according to claim 1, wherein said titanium substrate is formed of a titanium alloy.

5. A method according to claim 1, wherein said hardened layer is nonmagnetic.

6. A method according to claim 1, wherein the surface roughness of said titanium magnetic disk substrate is $R_{max} \leq 0.1$ μm after said step of forming a hardened layer is performed.

7. A method of manufacturing a titanium magnetic disk, comprising the steps of:
   preparing a titanium substrate;
   setting the surface roughness of said titanium substrate to be $R_{max} \leq 0.08$ μm;
   forming a hardened layer having a hardness of $H_v \geq 250$ on said titanium substrate to a thickness of 50 to 250 μm by sputtering; and
   forming a magnetic film on said hardened layer after said hardened layer si formed, without performing an intermediate polishing step.

8. A method according to claim 7, wherein said titanium substrate is formed of pure titanium.

9. A method according to claim 7, wherein said titanium substrate is formed of a titanium alloy.

10. A method according to claim 7, wherein said step of setting the surface roughness of said titanium substrate is achieved by polishing the surface of said titanium substrate.

11. A method according to claim 7, wherein said hardened layer is nonmagnetic.

12. A method according to claim 7, wherein the surface roughness of said titanium magnetic disk substrate is $R_{max} \leq 0.1$ μm after said step of forming a hardened layer is performed.

* * * * *